US005520266A

United States Patent [19]

Maras

[11] Patent Number: 5,520,266
[45] Date of Patent: May 28, 1996

[54] BICYCLE TOE PLATE FOR USE WITH A COASTER BRAKE

[76] Inventor: Jon A. Maras, 241 W. Leona St., Celina, Ohio 45822

[21] Appl. No.: 360,274

[22] Filed: Dec. 21, 1994

Related U.S. Application Data

[63] Continuation-in-part of Ser. No. 223,558, Apr. 6, 1994, abandoned.

[51] Int. Cl.⁶ .................................................. B62L 5/00
[52] U.S. Cl. ................................ 188/24.11; 188/24.17; 192/6 R
[58] Field of Search .................... 188/24.17, 24.11, 188/24.12, 24.13, 24.22; 192/6 R, 5, 6 A, 6 B; 280/261

[56] References Cited

U.S. PATENT DOCUMENTS

| | | |
|---|---|---|
| 603,325 | 5/1898 | Fader . |
| 622,523 | 4/1899 | McElroy . |
| 646,302 | 3/1900 | Morrow . |
| 1,023,347 | 4/1912 | Whittington . |
| 1,456,103 | 5/1923 | Goodchild . |
| 2,084,507 | 6/1937 | Scaison . |
| 2,084,508 | 6/1937 | Scaison . |
| 2,098,704 | 11/1937 | Glacy . |
| 2,871,988 | 2/1959 | Wilkerson . |
| 3,949,838 | 4/1976 | Fuhrman . |

Primary Examiner—Douglas C. Butler
Attorney, Agent, or Firm—Lundy and Associates

[57] ABSTRACT

A bicycle toe plate for use in combination with a bicycle wheel having a hub portion containing a coaster brake and an axle extending therethrough. The coaster brake includes a brake arm which is held in fixed relation to the bicycle frame by a protruding portion of the toe plate. The protruding portion of the toe plate defines a slot for receiving the brake arm wherein movement of the brake arm into engagement within the slot occurs simultaneously with the movement required to mount the bicycle wheel to the toe plate.

19 Claims, 9 Drawing Sheets

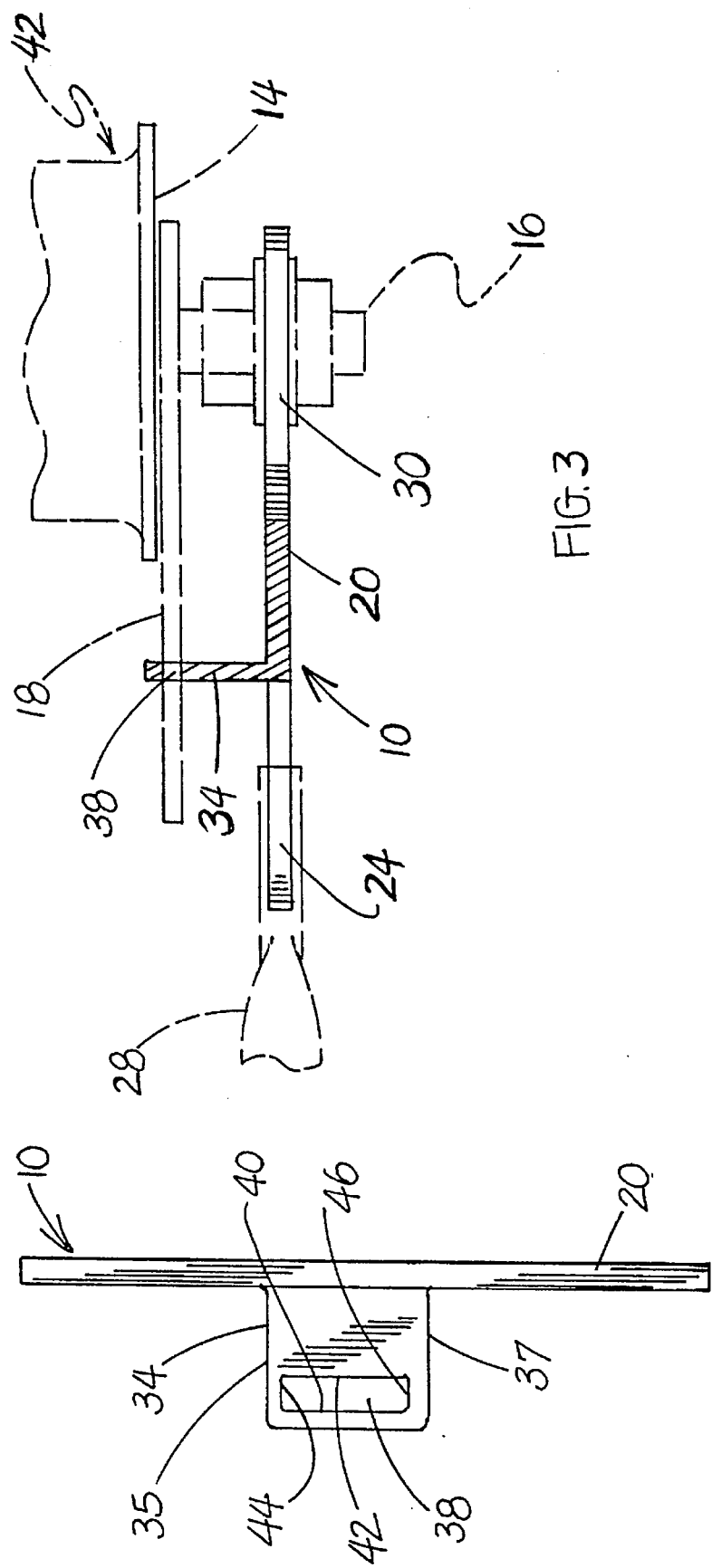

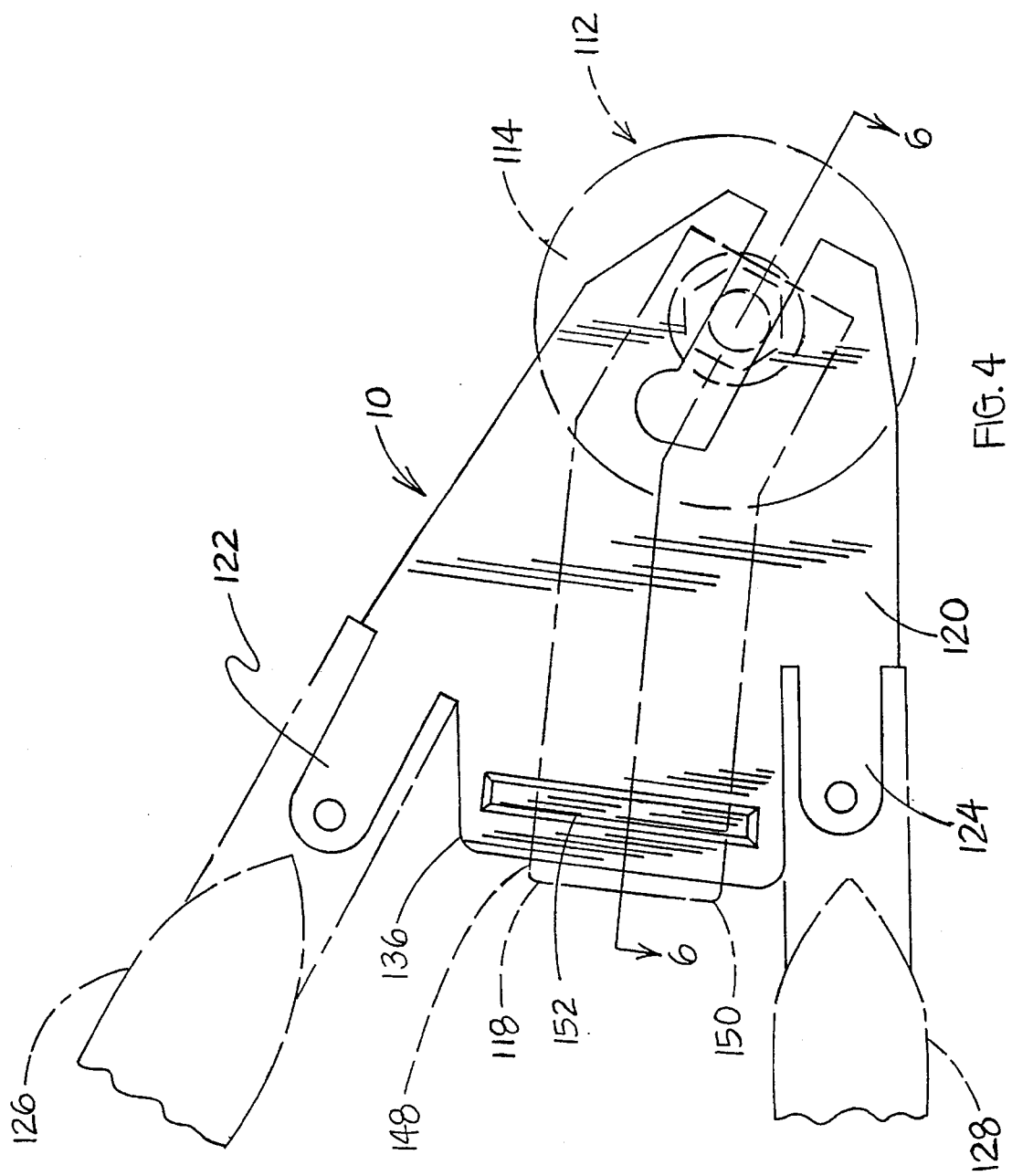

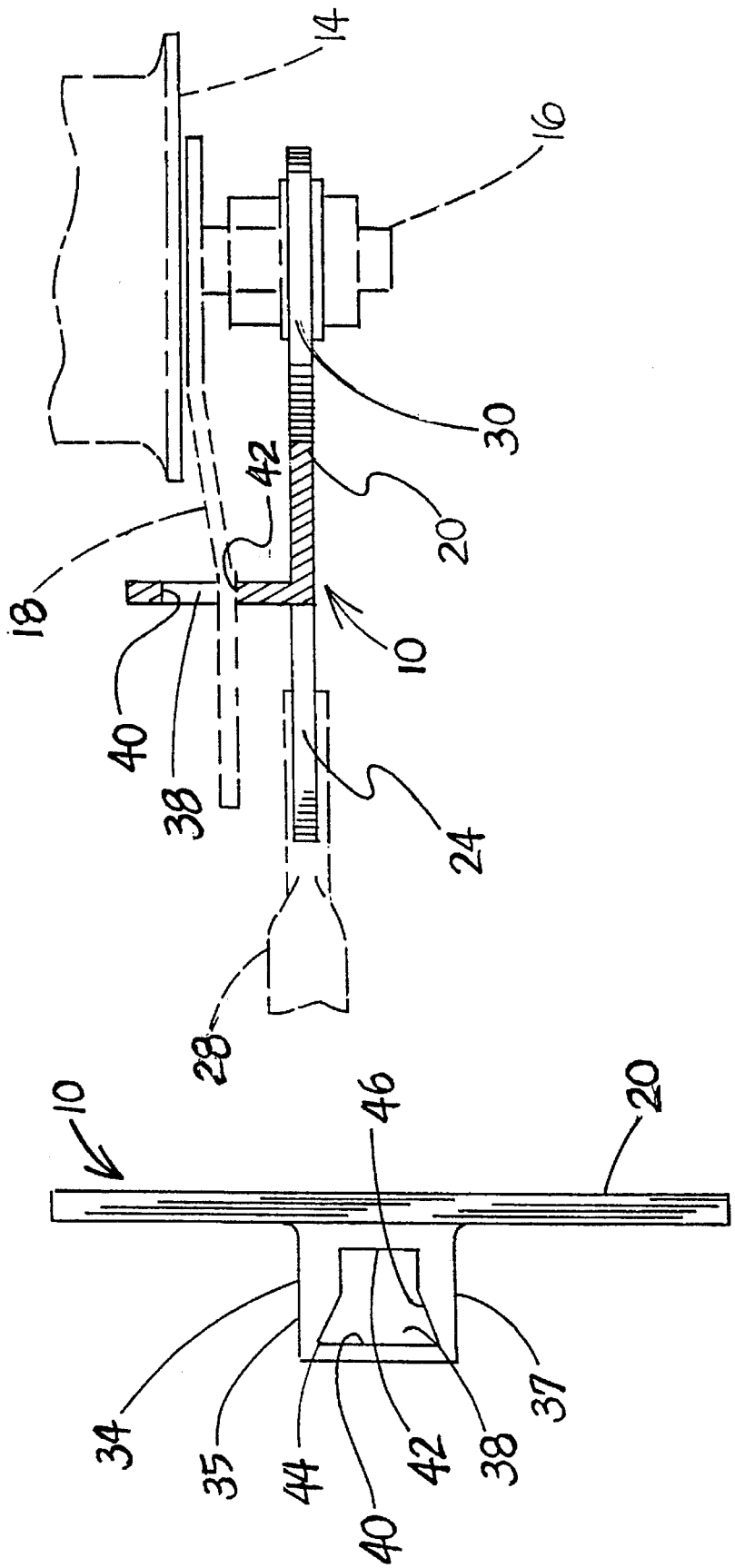

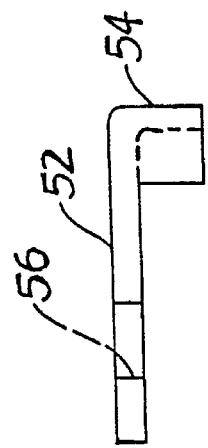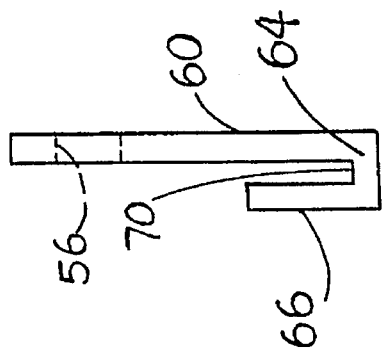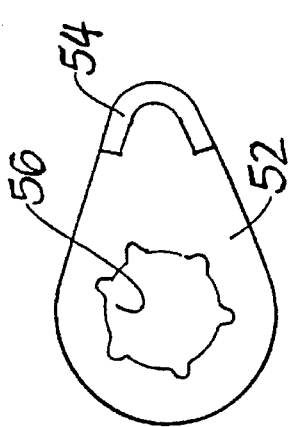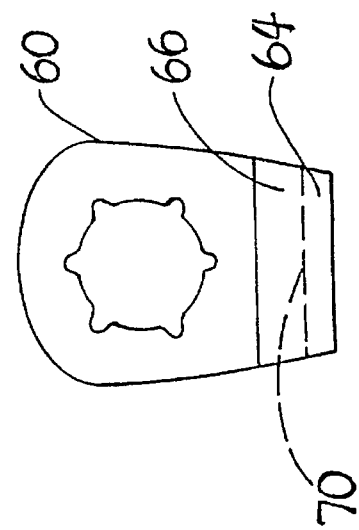
FIG.12
FIG.15
FIG.11
FIG.14

5,520,266

BICYCLE TOE PLATE FOR USE WITH A COASTER BRAKE

The present application is a continuation in part of U.S. patent application Ser. No. 08/223,558 entitled "BICYCLE TOE PLATE FOR USE WITH A COASTER BRAKE" filed on Apr. 6, 1994 now abandoned.

BACKGROUND OF THE INVENTION

The present invention relates to a bicycle toe plate and, more particularly, to a bicycle toe plate which is adapted to cooperate with a brake arm of a coaster brake to maintain the brake arm in a desired position relative to the frame of the bicycle.

In prior art bicycle systems incorporating coaster brakes, a coaster brake is provided located within the hub portion of a bicycle wheel wherein the coaster brake includes a brake arm which is held in a stationary position relative to the bicycle frame in order to provide a reaction force during actuation of the brake. Typically, the brake arm is held in position by providing a clamp which is attached extending around a lower bicycle stay and fastened to the brake arm by means of a conventional fastener.

While the known method for clamping the brake arm relative to the bicycle frame has proven to be a reliable means for holding the brake arm in place, such a clamping system requires an additional assembly operation during manufacture of the bicycle. For example, after the wheel has been attached to the toe plates of the bicycle, a clamp must be placed on a lower stay of the bicycle and aligned with the brake arm. Subsequently, a fastener, such as a screw, must be inserted through the clamp and brake arm and a nut must be provided for holding the screw in place.

SUMMARY OF THE INVENTION

It is therefore a primary object of the present invention to provide a system for attaching the brake arm of a coaster brake to a bicycle frame in a more efficient manner which reduces the parts and labor required from prior art systems.

In one aspect of the invention, a bicycle toe plate is provided for use in combination with a bicycle wheel having a hub portion containing a coaster brake and an axle extending therethrough wherein the coaster brake includes a brake arm. The toe plate comprises a planar portion for receiving the axle of the bicycle, and means are provided defining a brake arm slot or yoke in the toe plate for receiving the brake arm to thereby limit rotational movement of the brake arm about the axle.

In another aspect of the invention, the brake arm slot or yoke is defined in a protruding portion which extends substantially perpendicular to the planar portion at a forward end of the toe plate, and an axle slot is defined in the planar portion for receiving the bicycle axle. As the bicycle axle is moved into engagement within the axle slot, the brake arm is received within the slot or yoke formed in the protruding portion.

In a further aspect of the invention, the brake arm is modified to have an engagement portion extending generally perpendicularly of the brake arm to engage the toe plate within the axle slot or at an exterior edge thereof to limit rotational movement of the brake arm about the axle.

Other objects and advantages of the invention will be apparent from the following description, the accompanying drawings, and the appended claims.

BRIEF DESCRIPTION OF THE DRAWINGS

FIG. 2 is an elevational end view of the toe plate of FIG. 1;

FIG. 3 is a partial cross-sectional view taken along line 3—3 in FIG. 1;

FIG. 4 is a side elevational view of a second embodiment of the present invention;

FIG. 8 is an elevational end view of the embodiment of FIG. 7;

FIG. 9 is a partial cross-sectional view taken along line 9—9 in FIG. 7;

FIG. 11 is a side elevational view of the brake arm of FIG. 10;

FIG. 12 is a top view of the brake arm of FIG. 10;

FIG. 14 is a side elevational view of the brake arm for use with the toe plate shown in FIG. 13 having a hook port ion in which the toe plate of the invention is positioned; and FIG. 15 is an end view of the brake arm of FIG. 14.

DETAILED DESCRIPTION OF THE PREFERRED EMBODIMENT

Figure 1:
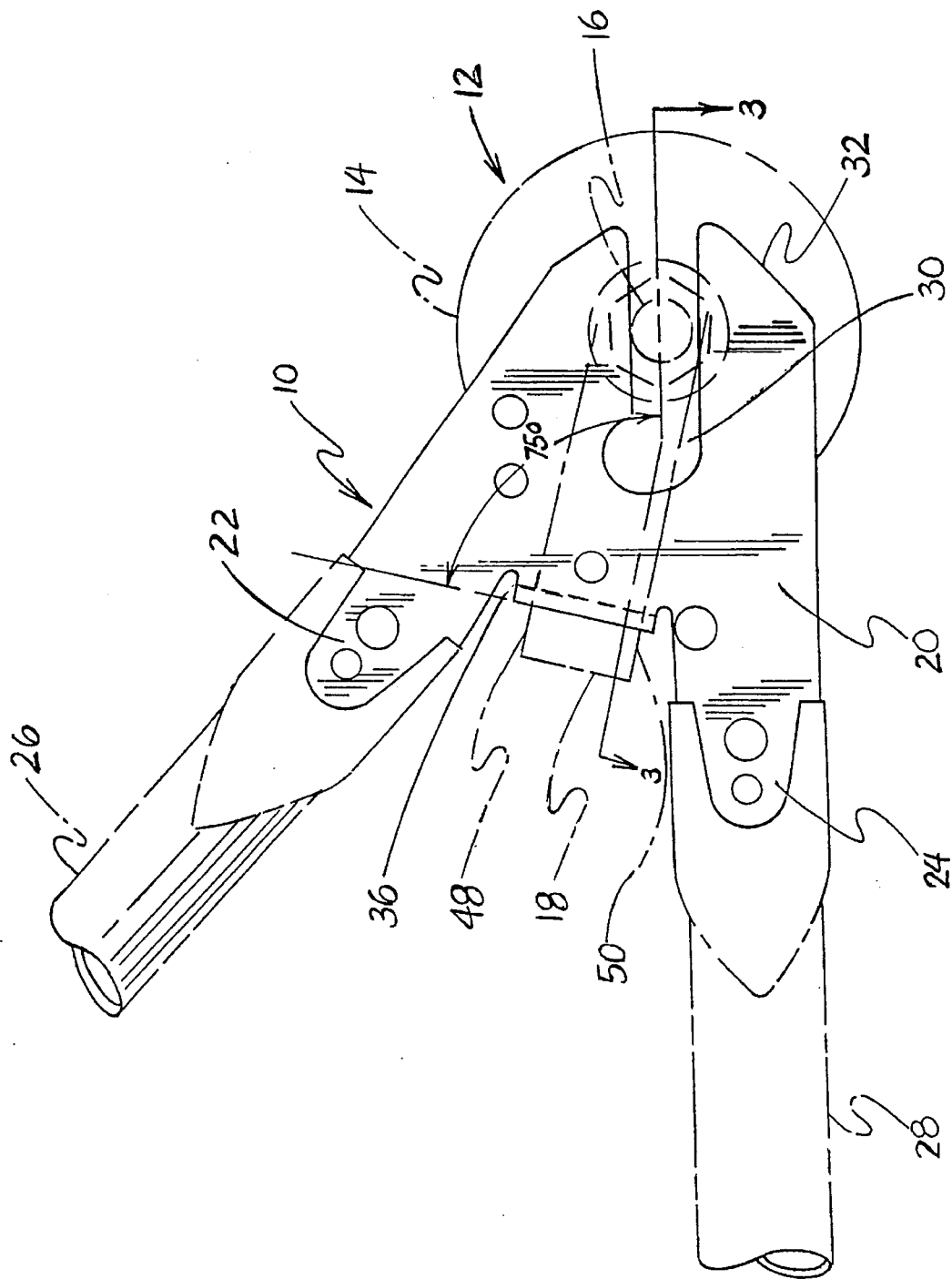
FIG. 1 is a side elevational view of a first embodiment of the toe plate of the present invention.

Referring initially to FIGS. 1–3, the toe plate 10 of the present invention is designed to be used in combination with a bicycle wheel having a hub portion 14 containing a conventional coaster brake (not shown) and having an axle 16 extending therethrough. In addition, the coaster brake includes a brake arm 18 for providing a reaction force during braking of the bicycle.

The toe plate 10 is formed having a planar portion 20 which defines a plane extending substantially parallel to the longitudinal axis of the bicycle frame. In addition, forwardly extending portions 22, 24 of the toe plate 10 are provided for engaging bicycle frame stays 26, 28, respectively, in a conventional manner.

The planar portion 20 includes an elongated axle slot 30 extending inwardly from a rearward end 32 of the toe plate 10 for receiving the axle 16.

A protruding portion 34 is formed integrally with the planar portion 20 at a forward end 36 of the toe plate 10. The protruding portion 34 is defined by a portion of the forward end 36 which is bent to extend substantially perpendicular to the planar portion 20, as is best seen in FIG. 3. The protruding portion 34 includes upper and lower edges 35, 37 and defines a second plane which is substantially perpendicular to the plane defined by the planar portion 20.

As may be best seen in FIG. 2, the protruding portion 34 includes a brake arm slot 38 located between the upper and lower edges 35, 37 displaced inwardly from the plane defined by the planar portion 20. In addition, the brake arm slot 38 is defined by opposing side edges 40, 42 and opposing top and bottom edges 44, 46. Referring further to FIG. 1, the protruding portion 34 and brake arm slot 38 extend upwardly in a direction transverse to the axle slot 30, and preferably extend at an angle of approximately 75° relative to the direction of elongation of the axle slot 30.

The brake arm slot 38 is adapted to receive the brake arm 18 as the axle 16 is moved forwardly within the axle slot 30 during mounting of the hub portion 14 to the toe plate 10. When the brake arm 18 is in position, opposing upper and lower edges 48, 50 of the brake arm 18 will be positioned in engagement with opposing contact surfaces defined by the top and bottom edges 44, 46 of the slot 38. With the brake arm 18 thus engaged within the slot 38, the brake arm 18 will be prevented from rotational movement about the axle 16 to thereby provide a reaction force for the coaster brake in a conventional manner during operation of the brake.

It should be noted that the present embodiment provides a toe plate 10 incorporating means including the protruding portion 34 formed integrally therewith for receiving the brake arm 18. Further, the protruding portion 34 is formed as a tab at a forward end 36 of the toe plate 10 located between the forwardly extending portions 22, 24 such that minimum design alteration of the toe plate from previous toe plate designs is required while also maintaining the structural integrity of the toe plate. In addition, by forming the element for engaging the brake arm integrally with the toe plate, the number of parts required to maintain the brake arm in position relative to the bicycle frame, and the amount of labor for assembly, is reduced.

Figure 6:
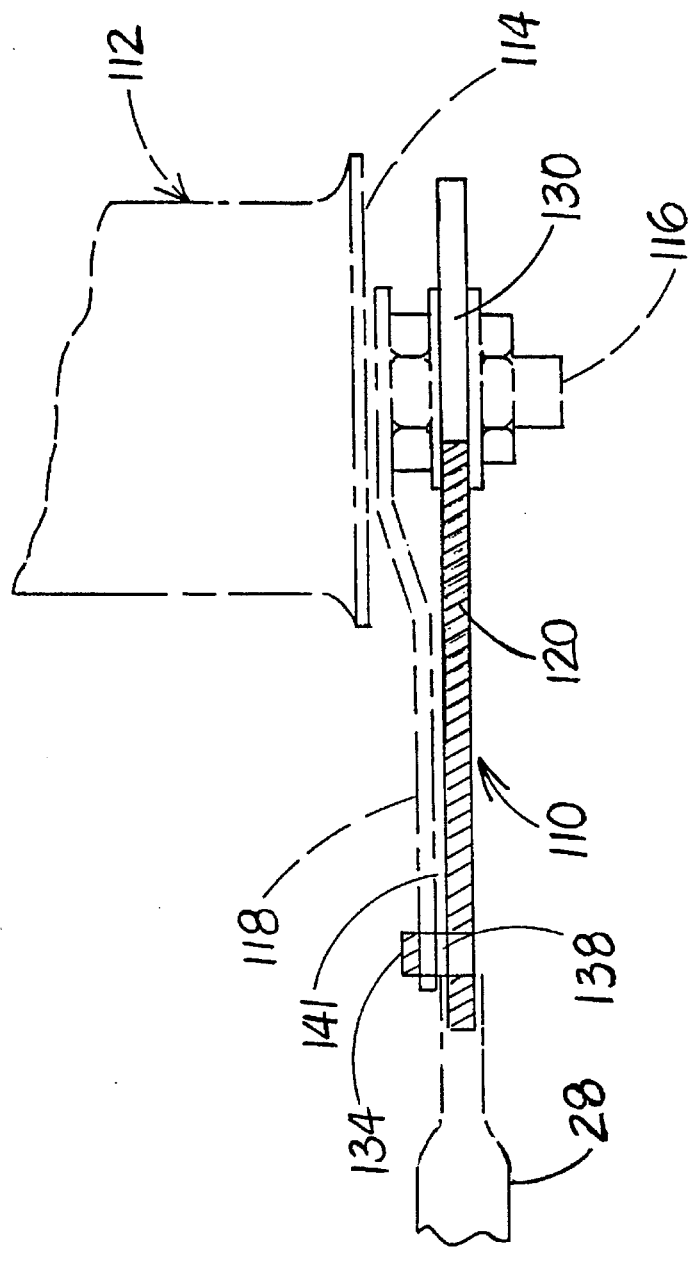
FIG. 6 is a partial cross-sectional view taken along line 6—6 in FIG. 4.
Figure 5:
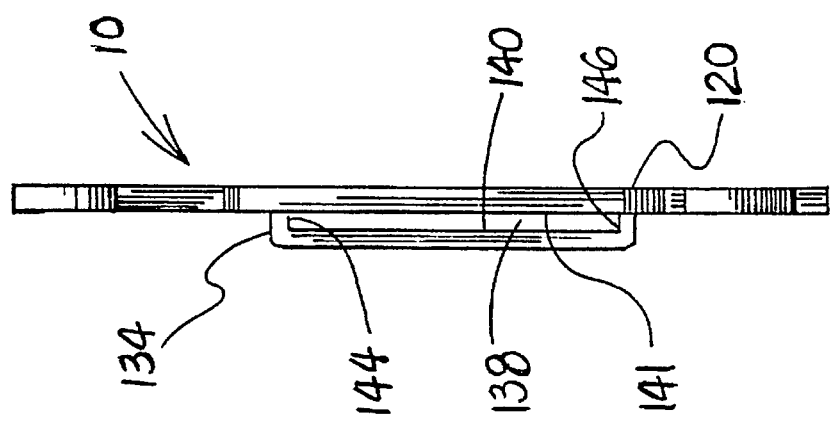
FIG. 5 is an elevational end view of the embodiment of FIG. 4.

Referring to FIGS. 4–6, an alternative embodiment of the present invention is illustrated. In all of the embodiments, elements corresponding to the same elements in the first embodiment have the same reference numerals.

In the second embodiment, a protruding portion 34 is provided defining a slot 38 for receiving a brake arm 18. The protruding portion 34 is defined by a loop of material which is punched out of a forward portion of the planar portion 20 rearwardly of the toe plate forward edge 36, thus forming an additional open slot 52 in the surface of the planar portion 20 of the toe plate 10 adjacent to the location of the slot 38.

A side edge 40 of the slot 38 is defined by the protruding loop 34 opposite from an inner surface 41 of the planar portion 20 to receive the brake arm 18 therebetween. In addition, top and bottom edges 44, 46 are formed to define upper and lower contact surfaces for contacting the upper and lower edges 48, 50 of the brake arm 18. The brake arm 18 is engaged within the slot 38 in a manner similar to that described for the first embodiment, wherein during forward movement of a wheel axle 16 into the axle slot 30, the brake arm 18 is simultaneously moved into engagement with the slot 38.

Figure 7:
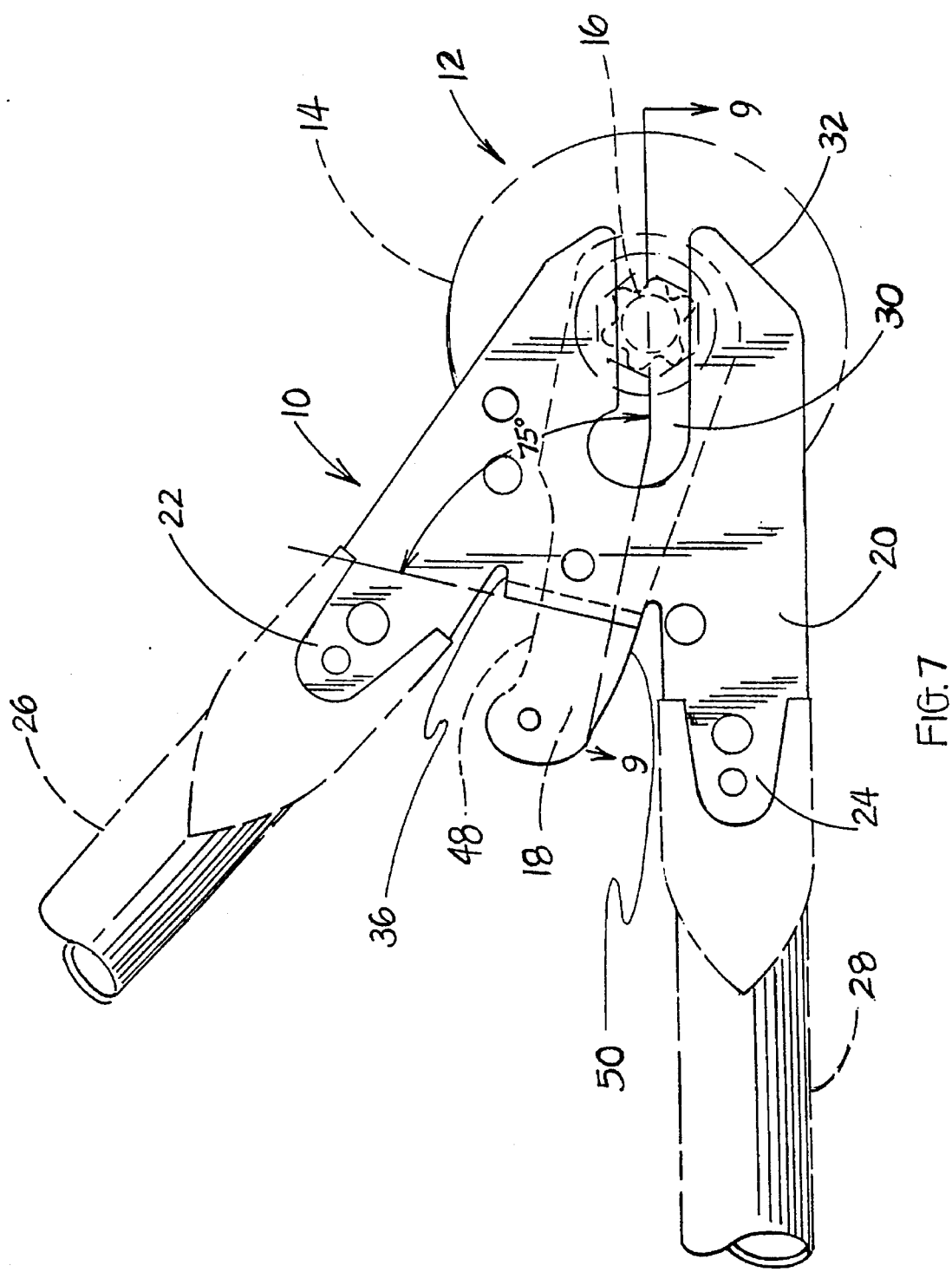
FIG. 7 is a side elevational view of a third embodiment of the present invention which is designed to use a conventional brake arm.

Referring to FIGS. 7–9, there is shown a third embodiment which allows the use of a conventional brake arm, for example a Shimano, CB-E110 brake arm which includes in part a toe plate which is made, for all practical purposes, to be the same as the toe plate shown in FIGS. 1–3 and described hereinabove, but is provided with a slot 38 shaped with opposing side edges 40, 42 generally parallel to each other, but with opposing top and bottom edges 44, 46 in part parallel and in part angularly disposed to each other. Top and bottom edges 44, 46 have tapered portions which taper inwardly toward each other in the direction of toe plate 10. Edges 44, 46 are tapered and spaced apart a distance greater than the widest brake arm available remote from top plate 10, and parallel to each other and spaced apart a distance essentially equal to the width of the brake arm 18 adjacent to toe plate 10. Additionally, edge 42 is spaced from toe plate 10 a distance equal to or greater than the distance between brake arm 18 and planar portion 20 of toe plate 10 when assembled. This embodiment has the advantage over the embodiment illustrated in FIGS. 1–3 in that conventional brake arms and brake arms of a variety of width dimensions can be utilized with the toe plate illustrated in FIGS. 7–9 as all of these toe plates can be positioned within slot 38 and as the axle bolts are tightened, the brake arm is moved toward the toe plate into engagement with the top and bottom edges 44, 46 of the slot 38, and thereby held in the desired position irrespective of the width dimension of the brake arm. Depending upon the dimensions of the brake arm utilized with the toe plate shown in FIGS. 7–9, the brake arm in a secured position is either adjacent slot edge 42 and generally parallel to planar portion 20 or toe plate 10 or bent slightly outwardly away from toe plate 10 well within the elastic limit of the brake arm. In this fashion, the brake arm is always urged into engagement with edge 42 and the top and bottom edges 44, 46 of the slot 38 and restrained from rotational movement about the axle.

Figure 10:
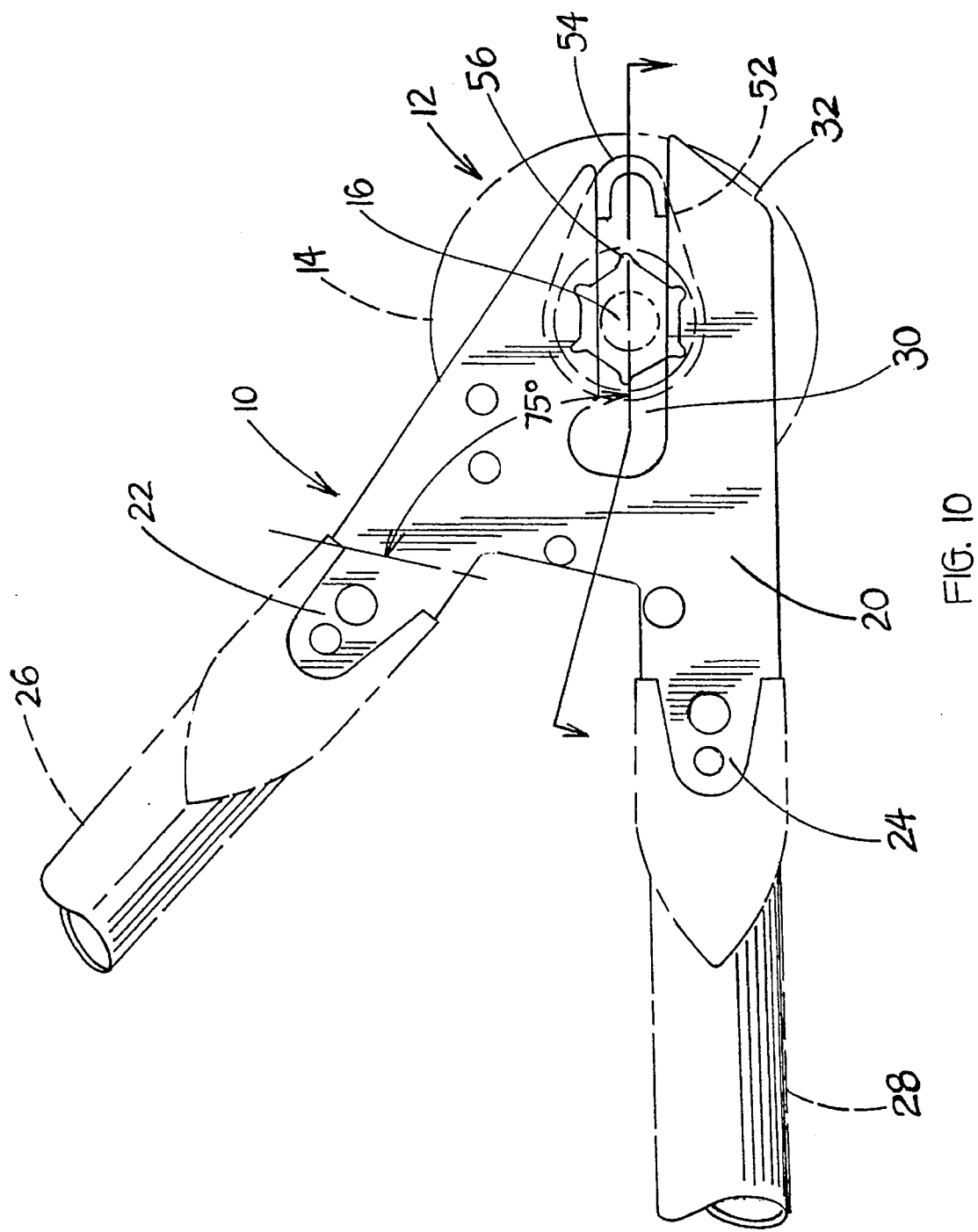
FIG. 10 is a side elevational view of a fourth embodiment of the toe plate of the invention showing the brake arm having a laterally extending dog tab positioned within the axle slot of the brake arm.

Referring to FIGS. 10–12, there is shown a brake arm 52 modified to have a dog tab 54 extending laterally thereof at a position spaced apart from a conventional axle hole 56. The spacing between the axle hole 56 and the dog tab 54 is chosen such that the dog tab 54 can be positioned within the axle slot 30 of the toe plate 10 and spaced from the axle 16 as shown in FIG. 10.

Figure 13:
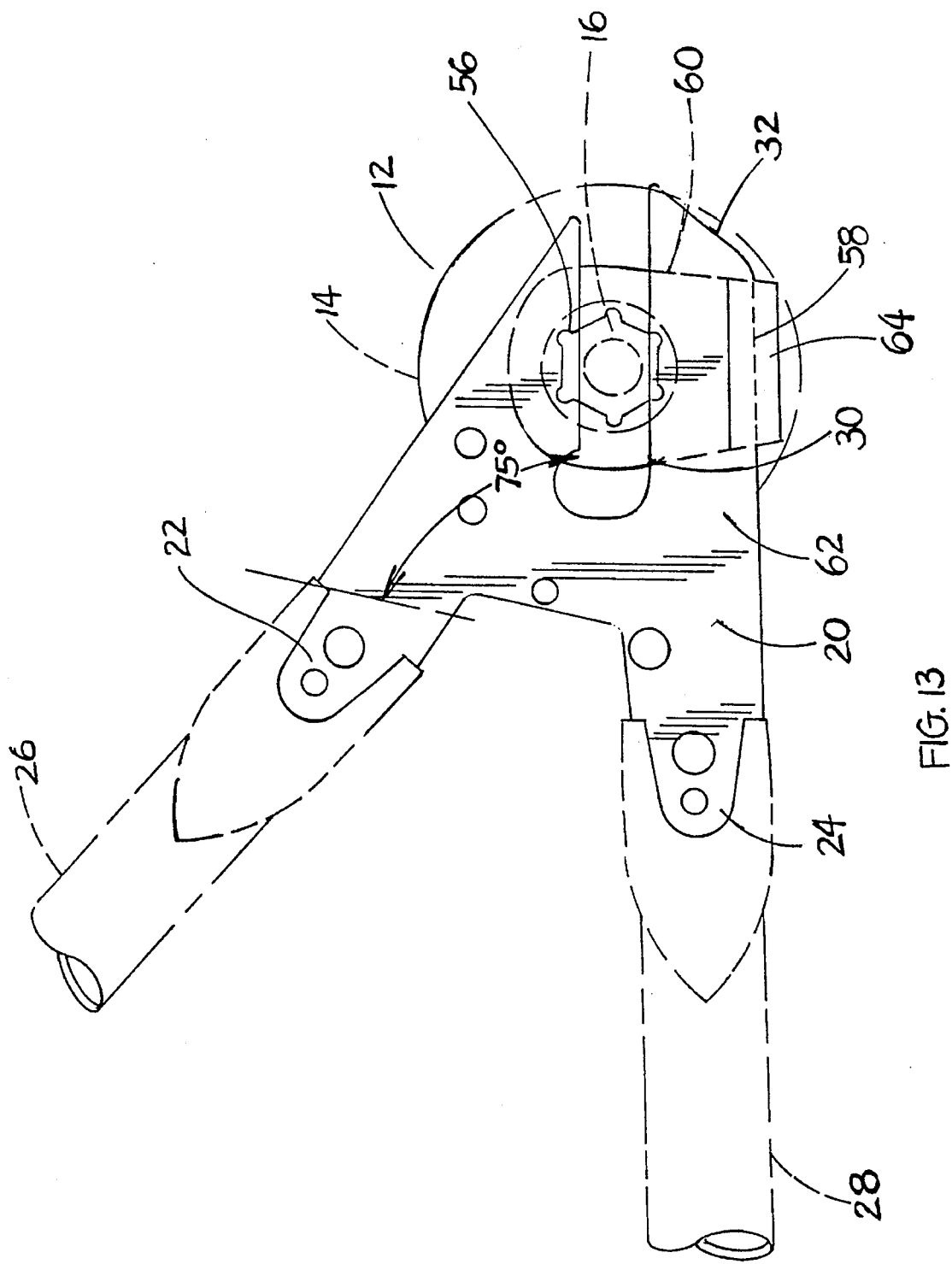
FIG. 13 is a side elevational view of a fifth embodiment of the toe plate of the invention showing a flat against which the brake arm is positioned.

Referring to FIGS. 13–15, there is shown a toe plate 62 which has been modified to have a flat edge 58 generally parallel to the axle slot. The brake arm 60 shown in FIGS. 14 and 15 has a bent over portion 64 spaced from the axle hole 56 which engages the flat edge 58 of the toe plate when the axle is positioned within the axle slot and secured. In this position, the bent over tab 64 of the brake arm 60 is held from rotational movement about the axle by surface to surface contact between the bent over tab 64 of the brake arm 60 and the edge 58 of the toe plate 62.

FIGS. 14 and 15 show the brake arm 60 and tab 64 forming a hook 66 formed at one end 68 therein at a position spaced from the axle bole 56 so as to engage the toe plate 62. Hook 66 defines a bottom edge 70 which engages the edge 58 of toe plate 62 when the toe plate 62 is positioned within the hook 66. Hook 66 insures the maintenance of the engagement between the brake arm and the toe plate at all times and like all of the other embodiments of the invention, limits the rotation and movement of the brake arm about the axis relative to the toe plate.

While the forms of apparatus herein described constitute preferred embodiments of the invention, it is to be understood that the invention is not limited to these precise forms of apparatus, and that changes may be made therein without departing from the scope of the invention, which is defined in the appended claims.

What is claimed is:

1. A bicycle toe plate for use in combination with a bicycle wheel having a hub portion containing a coaster brake and an axle extending therethrough, said coaster brake including an elongated brake arm, said toe plate comprising a planar portion with a slot therein for receiving said axle, and means spaced from said axle slot defining a brake arm engagement surface on said toe plate for engaging said brake arm, said brake arm being longer than the spacing between said surface and said axle slot, said axle slot and said brake arm engagement surface having a positional and structural relationship which allows said axle to be slid into said axle slot and said brake arm to be engaged with said engagement surface simultaneously in one sliding motion thereby to assemble said coaster brake and toe plate and to essentially prevent rotational movement of said brake arm about said axle.

2. The toe plate as in claim 1, wherein said planar portion includes a protruding portion defining a brake arm slot, said brake arm slot being displaced from said planar portion.

3. The toe plate as in claim 2, wherein said brake arm slot defines opposing brake arm engagement surfaces for contacting opposing edges of said brake arm.

4. The toe plate as in claim 2, wherein said protruding portion is defined by an end portion of said toe plate bent to extend away from said planar portion.

5. The toe plate as in claim 4, wherein said brake arm slot is defined by a through aperture located between upper and lower edges of said end portion.

6. The toe plate as in claim 2, wherein said planar portion includes a front edge and a rear edge and said protruding portion comprises a protruding loop element punched out of said planar portion to adjust to said front edge.

7. The toe plate as in claim 2, wherein said brake arm slot is defined by said engagement surfaces.

8. The toe plate as in claim 7, wherein said engagement surfaces taper toward each other, said surfaces being closer together adjacent to said toe plate than remote from said toe plate.

9. The toe plate as in claim 8, wherein said brake arm is biased toward said toe plate thereby being wedged between said engagement surfaces.

10. The toe plate as in claim 2, wherein said engagement surfaces are surfaces of said brake arm slot.

11. The toe plate as in claim 1, wherein said brake arm slot is elongated in a direction transverse to the direction of elongation of said axle slot.

12. The toe plate as in claim 1 wherein said brake arm has a protruding portion, said protruding portion adapted to engage said engagement surface, and said planar portion has said engagement surface thereon.

13. The toe plate as in claim 12, wherein said engagement surface is a pair of spaced facing engaging surfaces for contacting said brake arm.

14. The toe plate as in claim 12, wherein said engagement surface is an exterior edge portion of said planar portion.

15. A bicycle toe plate for use in combination with a bicycle wheel having a hub portion containing a coaster brake and an axle extending therethrough, said coaster brake including an elongated brake arm, said toe plate comprising a planar portion with a slot therein for receiving said axle, a protruding portion extending between said planar portion and said brake arm, and means spaced from said axle slot for defining a brake arm engagement surface on said protruding portion, said brake arm being longer than the spacing between said surface and said axle slot, said axle slot and said brake arm engagement surface having a positional and structural relationship which allows said axle to be slid into said axle slot after said brake arm is engaged with said engagement surface in one sliding motion thereby to assemble said coaster brake and toe plate and to essentially prevent rotational movement of said brake arm relative to said toe plate about said axle.

16. The toe plate as in claim 15, wherein said protruding portion defines a plane extending generally perpendicular to said planar portion.

17. The toe plate as in claim 16, wherein said protruding portion has a brake arm slot therein partially defining opposing contact surfaces for contacting opposing edges of said brake arm.

18. The toe plate as in claim 16, wherein said protruding portion is formed integrally with said planar portion and is bent away from said planar portion.

19. A bicycle toe plate for use in combination with a bicycle wheel having a hub portion containing a coaster brake and an axle extending therethrough, said coaster brake including an elongated brake arm, said toe plate comprising a planar portion with a slot extending inwardly from a rearward end of said toe plate for receiving said axle, a protruding portion formed integrally with said planar portion spaced from said axle slot and defined by a forward portion of said toe plate extending generally perpendicular to said planar portion defining a brake arm engagement surface said brake arm being longer than the spacing between said surface and said axle slot, said brake arm engaging said engagement surface, said surface contacting opposing edges of said brake arm, said axle slot and said brake arm engagement surface having a positional and structural relationship which allows said axle to be slid into said axle slot after said brake arm is engaged with said engagement surface in one sliding motion thereby to assemble said coaster brake and toe plate and to essentially prevent rotational movement of said brake arm about said axle.

* * * * *